(12) United States Patent
Guzman-Casillas et al.

(10) Patent No.: US 8,194,374 B2
(45) Date of Patent: Jun. 5, 2012

(54) DIFFERENTIAL ELEMENT WITH HARMONIC BLOCKING AND HARMONIC RESTRAINT OPERATING IN PARALLEL

(75) Inventors: Armando Guzman-Casillas, Pullman, WA (US); Normann Fischer, Colfax, WA (US)

(73) Assignee: Schweitzser Engineering Laboratories, Inc., Pullman, WA (US)

( * ) Notice: Subject to any disclaimer, the term of this patent is extended or adjusted under 35 U.S.C. 154(b) by 703 days.

(21) Appl. No.: 12/424,705

(22) Filed: Apr. 16, 2009

(65) Prior Publication Data

US 2010/0264749 A1 Oct. 21, 2010

(51) Int. Cl.
*H02H 3/00* (2006.01)
(52) U.S. Cl. ............................................. 361/81; 361/62
(58) Field of Classification Search ...................... 361/62, 361/65, 67, 68, 81, 115
See application file for complete search history.

(56) References Cited

U.S. PATENT DOCUMENTS

| | | | |
|---|---|---|---|
| 4,402,028 A | 8/1983 | Udren | |
| 6,341,055 B1 | 1/2002 | Guzman-Casillas | |
| 6,356,421 B1 | 3/2002 | Guzman-Casillas | |
| 7,903,381 B2 * | 3/2011 | Fischer et al. | 361/87 |

FOREIGN PATENT DOCUMENTS

| | | |
|---|---|---|
| WO | 0142253 | 6/2001 |
| WO | 2005064759 | 7/2005 |

OTHER PUBLICATIONS

Schweitzer Engineering Laboratories, Inc., SEL-787 Transformer Protection Relay, Apr. 7, 2008 www.selinc.com.
Schweitzer Engineering Laboratories, Inc., SEL-487E Transformer Protection Relay; Three-Phase Transformer Protection, Automation and Control System, www.selinc.com, Jul. 29, 2008.
A. Guzman, H. Altuve, D. Tziouvaras, Power Transformer Protection Improvements with Numerical Relays Feb. 28, 2005.
Armando Guzman, Hector Altuve, Gabriel Benmouyal,Schweitzer Engineering Laboratories, Inc., Power Transformer Protection, Feb. 3, 2003.
Ken Behrendt, Normann Fischer, Casper Labuschagne, Considerations for Using Harmonic Blocking and Harmonic Restraint Techniques on Transformer Differential Relays, Oct. 19, 2006.

* cited by examiner

*Primary Examiner* — Danny Nguyen
(74) *Attorney, Agent, or Firm* — Stoel Rives LLP (57) ABSTRACT

An intelligent electronic device (IED) provides harmonic blocking and harmonic restraint differential protection operating in parallel. The IED includes a harmonically-blocked differential element supervised by one or more even harmonics of a raw operating current (a current comprising the fundamental operating current and the harmonics thereof). The IED also includes a parallel, harmonically-restrained differential element, which is restrained by harmonics of the raw operating current. Tripping signals output by the parallel harmonically-blocked differential element and the harmonically-restrained differential element may be selectively combined into a single tripping signal output. An additional harmonic blocking element may supervise both differential elements and/or the combined tripping signal. The additional harmonic blocking element may provide odd-harmonic blocking, such as harmonic blocking based on a fifth harmonic of the raw operating current.

26 Claims, 8 Drawing Sheets

DIFFERENTIAL ELEMENT WITH HARMONIC BLOCKING AND HARMONIC RESTRAINT OPERATING IN PARALLEL

TECHNICAL FIELD

This disclosure relates to electrical power system protection and, in particular, to systems and methods for providing harmonic blocking and harmonic restraint differential elements operating in parallel.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION OF PREFERRED EMBODIMENTS

Transformer failures cause significant economic losses, resulting from the cost of repairing the transformer, the cost of energy not delivered because of transformer unavailability, possible additional costs of spreading data to adjacent equipment, and the like. In addition, transformer failures may present a hazard to people.

Internal and external faults and other abnormal operating conditions, such as overload, overexcitation, and overvoltage may stress power transformers. The transformer protection scheme should detect such conditions and disconnect the transformer before significant damage occurs in the transformer and/or in the power system components electrically coupled to the transformer.

When transformer internal faults occur, immediate disconnection of the faulted transformer is necessary to avoid extensive damage and/or preserve power system stability and power quality. A protective differential element may provide protection to the power transformer and/or power system components connected thereto. A differential element may be used to distinguish between faults internal to the transformer and external faults.

Differential elements, however, may be prone to misoperation in the presence of transformer inrush currents. Inrush currents may result from, inter alia, transients in the transformer magnetic flux. The harmonic content of the differential current may provide information to distinguish faults from inrush conditions. As such, some differential elements may incorporate a harmonic restraint element or a harmonic blocking element.

Transformer overexcitation is another possible cause of differential element misoperation. Several methods have been used to address such misoperation, including a fifth-harmonic blocking element and various wave shape recognition methods.

Typical harmonic blocking methods may ensure security for a relatively high percentage of inrush and/or overexcitation cases. However, these methods may fail in cases with low harmonic content in the operating current. Moreover, the use of harmonic restraint and/or blocking methods may increase the operating time of the differential element. Methods to address these deficiencies may delay element operation for internal faults combined with inrush in the nonfaulted phases of the transformer.

Figure 1:
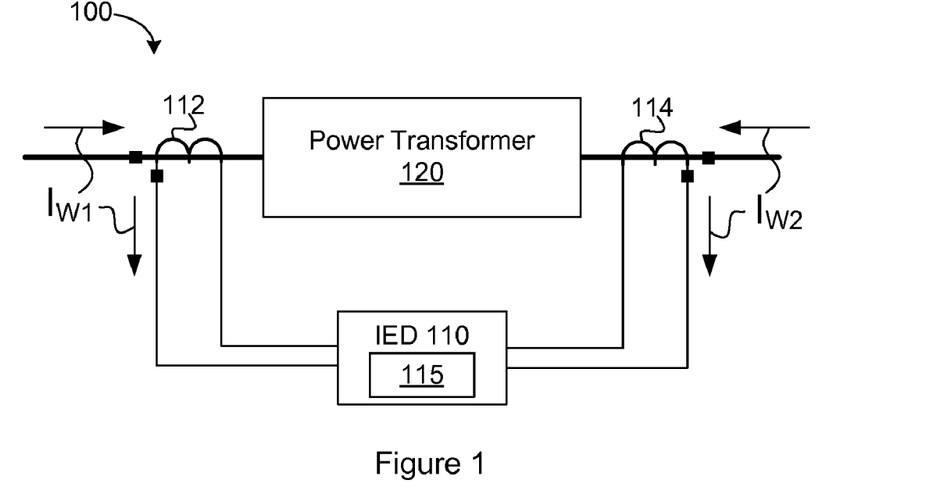
FIG. 1 depicts one embodiment of an electrical power system comprising an intelligent electronic device.

FIG. 1 depicts one embodiment of an electrical power system 100 comprising an intelligent electronic device (IED) 110 configured to provide differential protection to the power system 100. The IED 110 may be implemented as a protective relay, a differential relay, a phasor measurement unit (PMU), phasor measurement and control unit (PMCU), or the like. The IED 110 may include a computing device comprising a processor, memory, data storage media, one or more input/output devices, one or more communication interfaces, and the like.

The IED 110 may include a differential element 115 comprising circuitry and/or computer executable instructions embodied on a computer-readable storage medium. The differential element 115 may be configured to provide differential protection to the power system 100 and, in particular, to a power transformer 120.

The differential element 115 may implement a differential protection function. Under certain conditions, the differential element 115 may assert a tripping signal output, which may cause the IED 110 to take one or more actions including, but not limited to: disconnecting the power transformer 120 from the rest of the power system 100, tripping one or more breakers (not shown), transmitting an alarm signal, displaying an alarm on a human machine interface (HMI), recording measurements (and other data) that caused the tripping signal to assert, and the like.

The IED 110 and differential element 115 may be communicatively coupled to one or more current transformers 112 and 114. The current transformers 112 and 114 may be configured to obtain current measurements $I_{W1}$ and $I_{W2}$ at one or more portions of the power transformer 120 (e.g., at one or more windings of the transformer 120, at respective ends of the transformer 120, at one or more taps (not shown) of the transformer 120, or the like). The current measurements $I_{W1}$ and $I_{W2}$ may be communicated to the IED 110. Although FIG. 1 depicts two current measurements $I_{W1}$ and $I_{W2}$, the teachings of this disclosure may be applied to alternative configurations comprising additional current measurements (e.g., three current measurements $I_{W1}$, $I_{W2}$, and $I_{W3}$ (not shown) may be obtained from a transformer comprising three windings).

The differential protection function implemented by the differential element 115 may comprise calculating an operating current $I_{OP}$ and a restraining current $I_{RT}$ using the current measurements $I_{W1}$ and $I_{W2}$. The operating current $I_{OP}$ may be calculated as a magnitude of a sum of the currents entering the power transformer 120:

$$I_{OP} = |I_{W1} + I_{W2}| \qquad \text{Eq. 1}$$

In Equation 1, the operating current $I_{OP}$ is calculated using current measurements $I_{W1}$ and $I_{W2}$ obtained on two windings of the transformer 120. However, Equation 1 may be adapted to include other sets of current measurements according to the configuration of the power system and/or the transformer (e.g., the number of windings of the transformer, the location and/or orientation of the current transformers relative to the transformer, the number of current transformers used to obtain the current measurements, and so on).

The operating current $I_{OP}$ may comprise only its fundamental component (e.g., may exclude any harmonic content) and, as such, may be referred to as the fundamental operating current $I_{OP}$ and/or more generally as the operating current $I_{op}$. The fundamental operating current $I_{OP}$ may be calculated using processed current measurements (e.g., the current measurements $I_{W1}$ and $I_{W2}$ of Equation 1 may be filtered to remove harmonic content therefrom) and/or may be calculated by processing a raw operating current $I_{OP\_Raw}$. As used herein, a raw operating current $I_{OP\_Raw}$ may include the fundamental component of the operating current as well as any harmonic content thereof. Therefore, the raw operating current $I_{OP\_Raw}$ may be calculated using instantaneous (e.g., raw) current measurements as shown in Equation 1.1:

$$I_{OP\_Raw} = I_{W1\_Raw} + I_{W2\_Raw} \qquad \text{Eq. 1.1}$$

The restraining current $I_{RT}$ may be computed in various different ways. The most common methods used to calculate the restraining current are provided below in Equations 2-4:

$$I_{RT} = k|I_{W1} - I_{W2}| \qquad \text{Eq. 2}$$

$$I_{RT} = k(|I_{W1}| + |I_{W2}|) \qquad \text{Eq. 3}$$

$$I_{RT} = \text{Max}(|I_{W1}|, |I_{W2}|) \qquad \text{Eq. 4}$$

In Equations 2-3, k is a compensation factor, which is usually 1 or 0.5. As discussed above in conjunction with Equation 1, the Equations 2-4 may be adapted according to the configuration of the power system, the transformer, the current transformers used to obtain the current measurements $I_{W1}$ and $I_{W2}$, and the like. The restraining current $I_{RT}$ may be processed to include only the fundamental component thereof and/or may be calculated using similarly processed current measurements.

The differential element 115 may generate a tripping signal output if the fundamental operating current $I_{OP}$ is greater than the scaled restraining current $I_{RT}$ (e.g., the restraining current $I_{RT}$ scaled by a slope characteristic) and greater than a minimum pickup current value $I_{PU}$. Accordingly, the tripping signal of the differential element 115 may be asserted if Equation 5 is satisfied:

$$I_{OP} > \text{Max}[(SLP \cdot I_{RT}), I_{PU}] \qquad \text{Eq. 5}$$

In some embodiments, the value of the slope constant SLP may be adapted to respond to changing conditions within the power system 100 (e.g., such as detection of an external fault). In some cases, detection of an external fault (a fault outside of the power transformer 120) may cause the differential element 115 to use a different, less sensitive slope characteristic SLP. This may prevent misoperation of the differential element 115 due to transient conditions created by the external fault. After the external fault is cleared, the differential element 115 may resume using the more sensitive slope constant SLP. In some embodiments, a dual-slope characteristic may be used. The value of the dual-slope characteristic may change according to various detected conditions within the power system 100 (e.g., according to the amount of current flowing in the transformer 120).

Figure 2:
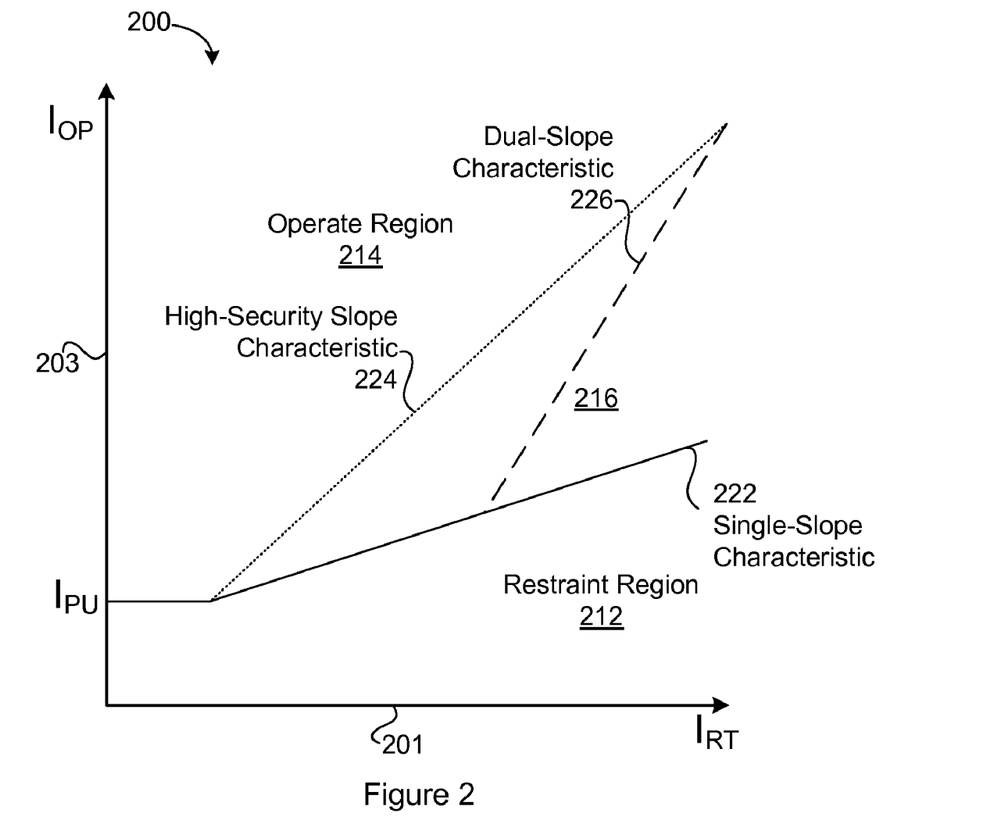
FIG. 2 depicts operate and restraint regions of a differential element characteristic.

FIG. 2 depicts one embodiment of a differential element characteristic 200 under various slope characteristics. The $I_{RT}$ axis 201 may represent restraining current $I_{RT}$, and the $I_{OP}$ axis 203 may represent fundamental operating current $I_{OP}$. The restraint region 212 corresponds to the condition where the fundamental operating current $I_{OP}$ is less than the scaled restraining current $I_{RT}$ and/or the pickup current threshold $I_{PU}$. The operate region 214 corresponds to the condition where the fundamental operating current $I_{OP}$ is greater than the scaled restraining current $I_{RT}$ and the pickup current threshold $I_{PU}$. Therefore, a differential element may assert a tripping signal if the fundamental operating current $I_{OP}$ and the restraining current $I_{RT}$ fall within the operate region 214, and may deassert the tripping signal otherwise (e.g., if the fundamental operating current $I_{OP}$ and restraining current $I_{RT}$ fall within the restraint region 212).

As shown in FIG. 2, the scaling factor (slope characteristic) applied to the restraining current $I_{RT}$ and the value of the pickup current threshold $I_{PU}$ (e.g., see Equation 5) define the restraint region 212 and the operate region 214. For example, area 216 shows an area where the use of a single-slope characteristic 222 would cause the differential element to operate (assert a tripping signal), whereas use of the less sensitive, high-security characteristic 224 or dual-slope characteristic 226 would prevent the differential element from operating.

The high-security characteristic 224 may be used upon detection of an external fault condition in the power system. As shown in FIG. 2, the high-security characteristic may reduce the sensitivity of the differential element to prevent misoperation of the element due to transient disturbances in the power system created by inter alia, an external fault. Alternatively, or in addition, a dual-slope characteristic 226 may be used. The dual-slope characteristic may provide sensitivity for low current values, and high security for high current values.

Referring back to FIG. 1, the differential element 115 of the IED 110 may perform adequately so long as outside disturbances are minimal and/or the current transformers 112 and 114 reproduce the primary currents correctly (e.g., currents $I_{W1}$ and $I_{W2}$). However, if one of the current transformers 112 or 114 saturates (or both current transformers 112 and 114 saturate at different levels), false operating current may appear in the IED 110, causing the differential element 115 to misoperate (e.g., trip in the absence of an internal fault).

Current transformer saturation is only one of several possible causes of false operating current in a differential element. For example, in power transformer applications, other possible sources of error include, but are not limited to: mismatch between current transformer ratios and the power transformer ratio; variable ratio of the power transformer caused by a tap changer; phase shift between the power transformer primary and secondary currents for delta-wye connections; magnetizing inrush currents caused by transformer transients due to energization; voltage recovery after clearance of an external fault; energization of a parallel transformer; high exciting currents caused by transformer overexcitation; and the like.

Harmonic content of the raw operating current $I_{OP\_Raw}$ may be used to restrain and/or block operation of a differential element. The harmonics may allow the differential element to distinguish between internal faults and other conditions, such as current inrush, magnetization, current transformer saturation, overexcitation, and the like.

For example, a differential element may be harmonically restrained by one or more harmonics of the raw operating current $I_{OP\_Raw}$. Therefore, rather than comparing the fundamental operating current $I_{OP}$ to a scaled restraining $I_{RT}$ value alone, a harmonically-restrained differential element may compare the fundamental operating current $I_{OP}$ to a sum of the scaled restraining current $I_{RT}$ and one or more scaled harmonics of the raw operating current $I_{OP\_Raw}$. For example, a harmonically-restrained, restraining current may be calculated per Equation 6:

$$SLP \cdot I_{RT} + K_2 I_2 + K_4 I_4 \qquad \text{Eq. 6}$$

In Equation 6, the harmonically-restrained, restraining current comprises a sum of the scaled restraining current $I_{RT}$ and scaled harmonics of the raw operating current $I_{OP\_Raw}$ (the scaled second harmonic $I_2$ and scaled fourth harmonic $I_4$). Equation 7 shows an operate/restrain characteristic of one embodiment of a harmonically-restrained differential element:

$$I_{OP} > SLP \cdot I_{RT} + K_2 I_2 + K_4 I_4 \qquad \text{Eq. 7}$$

In Equation 7, $I_{OP}$ represents the fundamental operating current $I_{OP}$. $I_2$ and $I_4$, represent even harmonics of the raw operating current $I_{OP\_Raw}$ (second and fourth harmonics respectively). $I_{RT}$ is the restraining current, and $K_2$ and $K_4$ are respective constant coefficients used to scale the harmonics $I_2$ and $I_4$. As used herein, the sum of the scaled restraining current and one or more scaled harmonics of the raw operating current $I_{OP\_Raw}$ may be referred to as a harmonically-restrained, restraining current. Therefore, a harmonically-restrained differential element operating according to Equation 7 may only operate (assert its tripping signal) if the fundamental operating current $I_{OP}$ is greater than the harmonically-restrained, restraining current (e.g., greater than a sum of the scaled restraining current $I_{RT}$ and one or more scaled even harmonics of the raw operating current $I_{OP\_Raw}$).

Some harmonics of the raw operating current $I_{OP\_Raw}$ have been identified as being well suited to preventing differential element misoperation. For example, the second harmonic ($I_2$) and/or fourth harmonic ($I_4$) of the raw operating current $I_{OP\_Raw}$ may be useful in preventing differential element misoperation due to current inrush conditions. Equation 7 may be rewritten to include these harmonics and the pickup current threshold $I_{PU}$ discussed above (where $I_2$ is the second harmonic of the raw operating current $I_{OP\_Raw}$, and $I_4$ is the fourth harmonic of the raw operating current $I_{OP\_Raw}$):

$$I_{OP} > \text{Max}\{SLP \cdot I_{RT} + K_2 I_2 + K_4 I_4, I_{PU}\} \qquad \text{Eq. 8}$$

A harmonically-restrained differential element operating according to Equation 8 may trip if the fundamental operating current $I_{OP}$ is greater than the harmonically-restrained, restraining current comprising a sum of the scaled restraining current $I_{RT}$, scaled second harmonic of the raw operating current $I_{OP\_Raw}$, and scaled fourth harmonic of the raw operating current $I_{OP\_Raw}$ (and is greater than the pickup current threshold $I_{PU}$). Other operating current harmonics, such as the fifth harmonic ($I_5$) of the raw operating current $I_{OP\_Raw}$ (discussed below) may be useful in preventing misoperation due to other conditions (e.g., transformer overexcitation and the like).

Harmonic blocking is another approach to prevent differential element misoperation. Unlike harmonic restraint, which desensitizes the differential element, harmonic blocking does not change the sensitivity of the differential element, but rather supervises the operation of the differential element under certain conditions. As used herein, supervising the operation of a differential element may comprise blocking (e.g., nullifying and/or cancelling out) the tripping signal asserted by the differential element under certain conditions.

Harmonic blocking logic may use any number of harmonics of the raw operating current $I_{OP\_Raw}$ to supervise a differential element. For example, it has been found that the second and fourth harmonics of the raw operating current $I_{OP\_Raw}$ may be effective at preventing differential element misoperation due to inrush current conditions and the like. Therefore, a second harmonic and/or fourth harmonic of the raw operating current $I_{OP\_Raw}$ may be used to produce a harmonic blocking signal. As discussed above, supervising a differential element may comprise blocking (e.g., nullifying or cancelling) the tripping signal generated by the differential element. For example, a differential element may assert a tripping signal under certain conditions (e.g., if the conditions of Equation 5 are satisfied). However, this tripping signal may have been caused by a current inrush or some other condition. A harmonic blocking element may generate a harmonic blocking signal responsive to detecting one or more of these conditions. The harmonic blocking signal may be used to supervise the differential element by blocking the tripping signal, to thereby prevent misoperation of the differential element.

Equations 9 and 10 are examples of second- and fourth-harmonic blocking conditions, which, if satisfied, may cause a harmonic blocking signal to be generated. Equation 11 is an example of a second- and fourth-harmonic individual blocking signal derived from Equations 9 and 10:

$$I_{OP} < K_2 I_2 \qquad \text{Eq. 9}$$

$$I_{OP} < K_4 I_4 \qquad \text{Eq. 10}$$

$$Blk_{2\_4} = I_{OP} < K_2 I_2 \| I_{OP} < K_4 I_4 \qquad \text{Eq. 11}$$

As shown in Equation 11, if either of the harmonic blocking conditions of Equations 9 or 10 is satisfied (e.g., if the scaled second harmonic $K_2 I_2$ and/or scaled fourth harmonic $K_4 I_4$ of the raw operating current $I_{OP\_Raw}$ exceed the fundamental operating current $I_{OP}$), the second- and fourth-harmonic individual blocking signal ($Blk_{2\_4}$) is asserted.

Figure 3A:
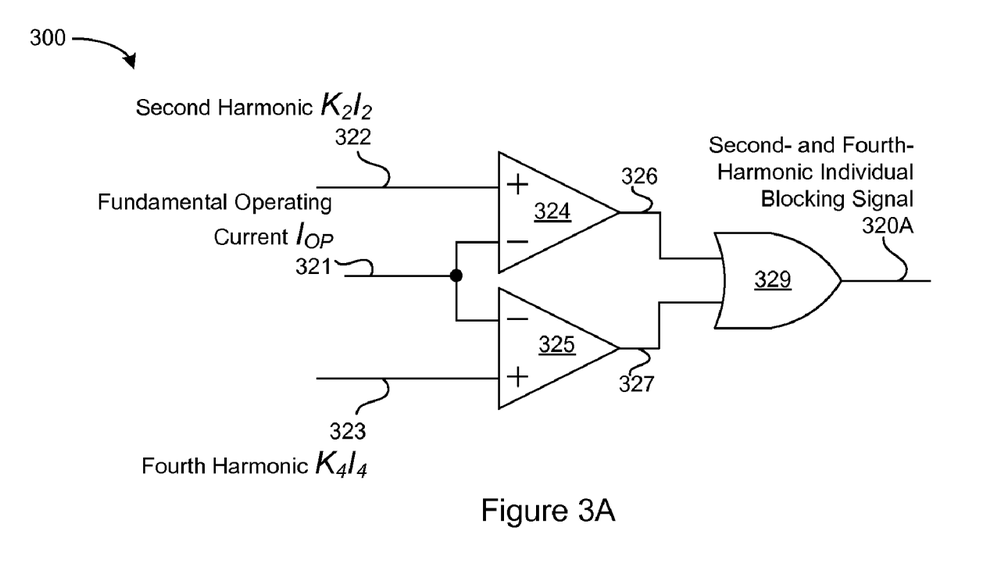
FIG. 3A is a block diagram of a harmonic blocking element configured to generate a second- and fourth-harmonic individual blocking signal.

FIG. 3A depicts one embodiment 300 of a harmonic blocking element configured to generate a second- and fourth-harmonic individual blocking signal.

The harmonic blocking element 300 includes a comparator 324, which receives a scaled second harmonic input $K_2 I_2$ 322 and a fundamental operating current $I_{op}$ input 321. As discussed above, the fundamental operating current $I_{OP}$ input 321 may be calculated using current measurements obtained at various points (e.g., windings) of a transformer. The current measurements used to calculate the fundamental operating current $I_{OP}$ may include one or more phases of a three-phase current signal. The scaled harmonic input $K_2 I_2$ 322 may be generated using a raw operating current $I_{OP\_Raw}$ which, as discussed above, may comprise the fundamental operating current $I_{OP}$ as well as any harmonic content thereof. The output 326 of the comparator 324 is asserted if the scaled second harmonic input $K_2 I_2$ 322 is greater than the fundamental operating current $I_{OP}$ input 321.

A comparator 325 receives a scaled fourth harmonic input $K_4 I_4$ 323 and the fundamental operating current $I_{OP}$ input 321. The output 327 of the comparator 325 asserts if the scaled fourth harmonic input $K_4 I_4$ 323 is greater than the fundamental operating current $I_{OP}$ input 321.

The outputs 326 and 327 of the comparators 324 and 325 flow to an OR gate 329, which asserts a second- and fourth-harmonic individual blocking signal 320A if either comparator output 326 or 327 is asserted (if either of the scaled second harmonic $K_2I_2$ 322 or the scaled fourth harmonic $K_4I_4$ 323 is greater than the fundamental operating current $I_{OP}$ 321). As discussed above, the second- and fourth-harmonic individual blocking signal 320A may be used to supervise the operation of a differential element to prevent misoperation of the differential element (e.g., by blocking a tripping signal produced by the differential element).

A harmonic common blocking signal may be derived from multiple elements, each of which may be communicatively coupled to an electrical power system to receive current measurements therefrom. For example, the power system may comprise a three-phase transformer, and each element may measure a respective phase of the currents entering the transformer (e.g., a first element may measure A-phase currents, a second element may measure B-phase currents, and so on). Alternatively, each element may measure multiple current phases. For instance, a first element may measure A-phase and B-phase currents, a second element may measure B-phase and C-phase currents, and/or a third element may measure C-phase and A-phase currents. As would be appreciated by one of skill in the art, the harmonic common blocking signal disclosed herein could be generated using any number of elements configured to receive any number and/or phases of the currents entering a transformer.

A harmonic common blocking signal may be used to supervise a differential element such that, if the harmonic blocking signal of any of the elements satisfies a harmonic blocking condition (e.g., Equations 9-11), the harmonic common blocking signal is asserted. Equation 12 shows a second- and fourth-harmonic common blocking signal derived from three elements and based on Equation 11:

$$I_{OP\_1} < K_2 I_{2\_1} \| I_{OP\_1} < K_4 I_{4\_1} \|$$

$$C\_Blk_{2\_4} = I_{OP\_2} < K_2 I_{2\_2} \| I_{OP\_2} < K_4 I_{4\_2} \|$$

$$I_{OP\_3} < K_2 I_{2\_3} \| I_{OP\_3} < K_4 I_{4\_3} \qquad \text{Eq. 12}$$

In Equation 12, $I_{2\_1}$ and $I_{4\_1}$ may be the second and fourth harmonics of a raw operating current $I_{OP\_Raw\_1}$ acquired by a first element, $I_{2\_2}$ and $I_{4\_2}$ may be the second and fourth harmonics of a raw operating current $I_{OP\_Raw\_2}$ acquired by a second element, and $I_{2\_3}$ and $I_{4\_3}$ may be the second and fourth harmonics of a raw operating current $I_{OP\_Raw\_3}$ acquired by a third element. The fundamental operating currents $I_{OP\_1}$, $I_{OP\_2}$, and $I_{OP\_3}$ are the fundamental operating currents $I_{OP}$ acquired by the first, second, and third elements, respectively. As shown in Equation 12, if any of the scaled second or fourth harmonics is greater than its respective fundamental operating current $I_{op}$, the second- and fourth-harmonic common blocking signal (C_Blk$_{2\_4}$) is asserted. As could be appreciated by one of skill in the art, Equation 12 could be adapted to generate a harmonic common blocking signal comprising any number of elements comprising any combination of current phase measurements.

Figure 3B:
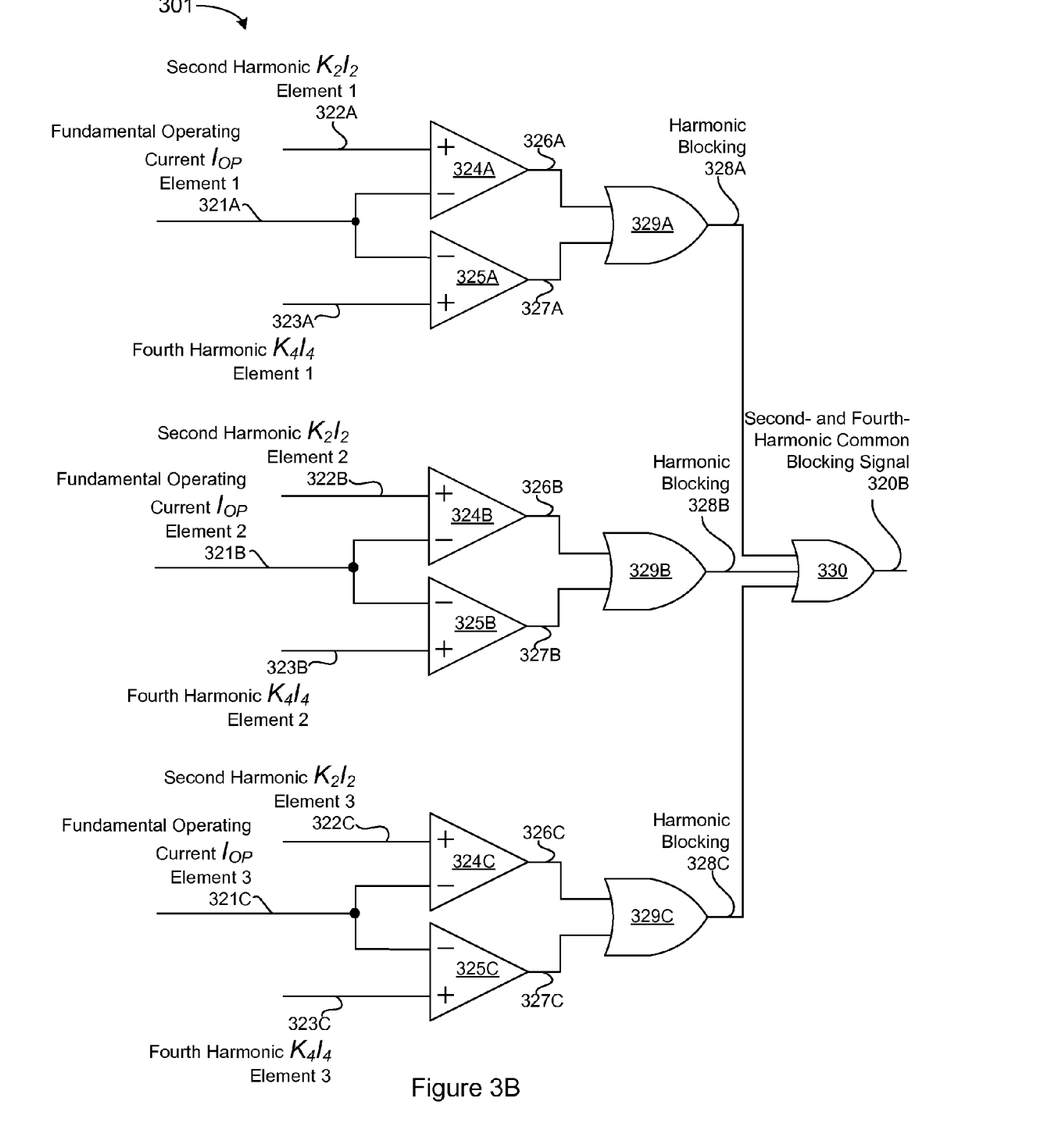
FIG. 3B is a block diagram of a harmonic blocking element configured to generate a second- and fourth-harmonic common blocking signal.

FIG. 3B depicts one embodiment of a harmonic blocking element 301 configured to generate a second- and fourth-harmonic common blocking signal based on the fundamental operating currents $I_{OP\_1}$ 321A, $I_{OP\_2}$ 321B, and $I_{OP\_3}$ 321C and the harmonics 322A-C and 323A-C of their respective raw operating currents $I_{OP\_Raw}$ (not shown). As discussed above, each of the fundamental operating currents $I_{OP}$ 321A-C may have been acquired by a respective element configured to receive current measurements from various portions of a transformer (e.g., on various windings, taps, and/or conductors electrically coupled to the transformer). Moreover, each of the fundamental operating currents $I_{OP}$ 321A-321C (and harmonics 322A-C and 323A-C) may be derived from one or more phases of a three-phase current system. The harmonic blocking element 301 generates respective second- and fourth-harmonic individual blocking signals 328A-328C for each of the fundamental operating currents $I_{OP}$ 321A-C. Although FIG. 3 depicts a harmonic common blocking signal 320B comprising the combination of three elements (a combination of the harmonic blocking signals 328A-C), the element 301 could be adapted to generate a harmonic common blocking signal comprising any combination of any number of elements. Therefore, this disclosure should not be read as limited to any particular number of elements and/or combination thereof.

As shown in FIG. 3B, the second- and fourth-harmonic individual blocking signal 328A is generated by comparing the first fundamental operating current $I_{OP\_1}$ 321A to the second harmonic 322A and fourth harmonic 323A of the corresponding raw operating current $I_{OP\_Raw\_1}$ (not shown). A second- and fourth-harmonic individual blocking signal 328B is generated by comparing the second fundamental operating current $I_{OP\_2}$ 321B to a second harmonic 322B and fourth harmonic 323B of the corresponding raw operating current $I_{OP\_Raw\_2}$ (not shown). A second- and fourth-harmonic individual blocking signal 321C is generated by comparing the third fundamental operating current $I_{OP\_3}$ 321C to a second harmonic 322C and fourth harmonic 323C of the corresponding raw operating current $I_{OP\_Raw\_3}$ (not shown).

Each of the harmonic individual blocking signals 328A-328C flow to the OR gate 330, the output of which comprises a second- and fourth-harmonic common blocking signal 320B, which asserts if any of the individual harmonic blocking signals 328A-328C is asserted. As discussed above, the second- and fourth-harmonic common blocking signal 320B may be used to supervise the operation of a differential element (e.g., may be used to nullify a tripping signal output by the differential element).

Other embodiments may include additional harmonic blocking elements. For example, an odd harmonic of the raw operating current $I_{OP\_Raw}$, such as the fifth harmonic, may be used to supervise one or more differential elements. It has been found that the fifth harmonic of the raw operating current $I_{OP\_Raw}$ may be effective in preventing differential element misoperation due to transformer overexcitation or the like. A fifth-harmonic blocking condition may be evaluated according to Equation 13 below:

$$I_{OP} < K_5 I_5 \qquad \text{Eq. 13}$$

Figure 4:
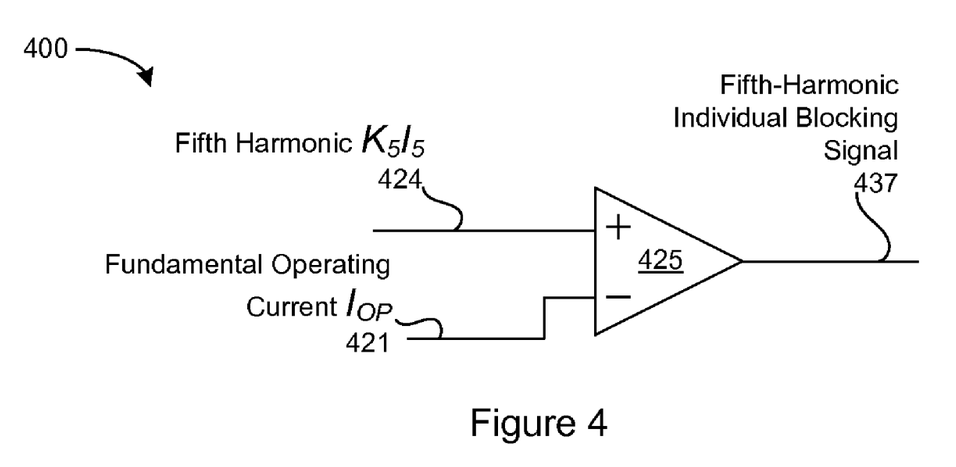
FIG. 4 is a block diagram of a harmonic blocking element configured to generate a fifth-harmonic individual blocking signal.

In Equation 13, $I_{OP}$ is the fundamental operating current $I_{OP}$, $I_5$ is the fifth harmonic of the raw operating current $I_{OP\_Raw}$, and $K_5$ is a constant coefficient. FIG. 4 shows one embodiment of a harmonic blocking element 400 configured to generate a fifth-harmonic individual blocking signal. The blocking element 400 includes a comparator 425, which compares a scaled, fifth-harmonic of the raw operating current $I_{OP\_Raw}$ 424 to the fundamental operating current $I_{OP}$ 421. If the scaled, fifth-harmonic 424 is greater than the fundamental operating current $I_{OP}$ 421, a fifth-harmonic individual blocking signal 437 is asserted. A fifth-harmonic common blocking signal (not shown) may be generated using a harmonic blocking element (not shown) similar to the harmonic blocking element 301 of FIG. 3B (e.g., the fifth-harmonic common blocking element may combine the outputs of plural harmonic blocking elements 400).

Although this disclosure discusses the use of particular harmonics and/or combinations of harmonics to generate individual and/or common harmonic blocking signals, any number of harmonics or combination of harmonics could be used under the teachings of this disclosure. As such, this disclosure should not be read as limited to any particular set of harmonic blocking signals.

Table 1 provides a summary of the respective advantages of the approaches to power system protection described above:

TABLE 1

| | Independent Even-Harmonic Restraint | Common Even-Harmonic Blocking |
|---|---|---|
| Security for External Faults | High | High |
| Security for Inrush | High | High |
| Dependability | High | High |
| Speed for Internal Faults After Energization | Lower | Higher |
| Speed for Internal Faults During Energization | Higher | Lower |
| Slope Characteristic | Harmonic dependent | Well defined |
| Testing | Results depend upon harmonic content | Straightforward |

The respective advantages of the harmonic restraint and harmonic blocking approaches discussed above may be leveraged by providing two or more differential elements operating in parallel. One of the parallel differential elements may be harmonically blocked (e.g., supervised by harmonic blocking as described above in conjunction with FIGS. 3A, 3B and/or Equations 9-12), and another differential element may be harmonically restrained (e.g., restrained as described above in conjunction with Equations 6-8). Some embodiments may further include supervision by an odd-harmonic blocking element to provide additional security (e.g., a fifth-harmonic blocking element as described in conjunction with FIG. 4 and/or Equation 13).

Figure 5:
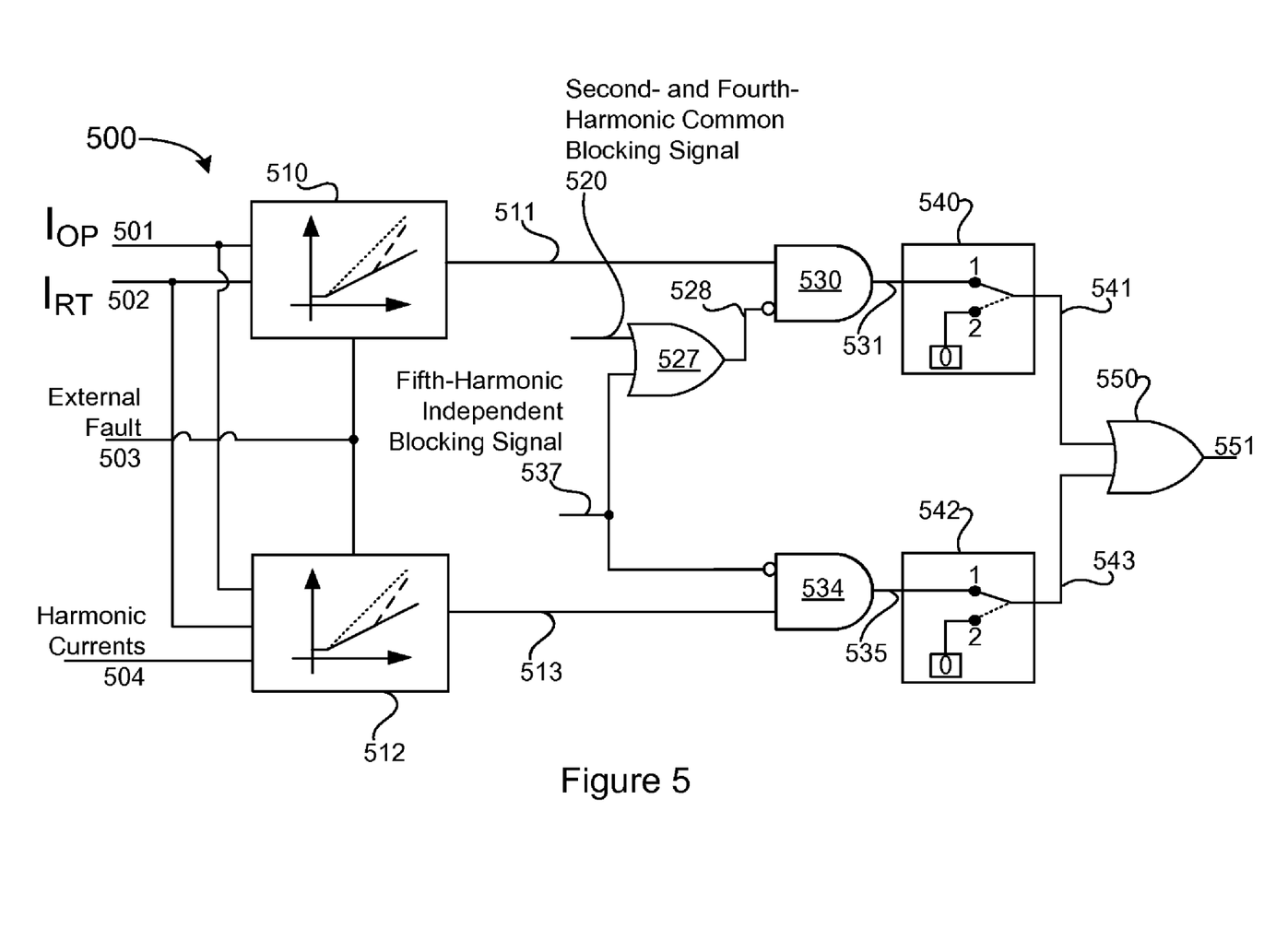
FIG. 5 is a block diagram of one embodiment of a system comprising harmonic blocking and harmonic restraint elements operating in parallel.

FIG. 5 is a block diagram of one embodiment of a system 500 comprising harmonic blocking and harmonic restraint elements operating in parallel. The system 500 may be implemented on and/or in conjunction with an IED, such as the IED 110 shown in FIG. 1. Therefore, the system 500 may be implemented as one or more hardware components and/or one or more computer-readable instructions stored on a computer-readable storage medium (not shown) of the IED. In some embodiments, the computer-readable instructions of system 500 may be embodied as one or more distinct software modules on a computer-readable storage medium.

The system 500 receives a fundamental operating current $I_{OP}$ input 501, a restraining current $I_{RT}$ input 502, an external fault input 503, and a harmonic currents input 504. As discussed above, the fundamental operating current $I_{OP}$ 501 and the restraining current $I_{RT}$ 502 may be calculated per Equations 1-5 using current measurements obtained from a transformer (e.g., at one or more windings of the transformer). The harmonic currents input 504 may comprise one or more harmonics of a raw operating current $I_{OP\_Raw}$. The current measurements upon which the fundamental operating current $I_{OP}$ 501, restraining current $I_{RT}$ 502, and/or harmonic currents 504 are based may comprise one or more phases of a three-phase current.

The system 500 includes a harmonically-blocked differential element 510, which may operate according to Equation 5. Therefore, the harmonically-blocked differential element 510 may assert a tripping signal output 511 if the fundamental operating current $I_{OP}$ 501 is greater than the restraining current $I_{RT}$ 502 scaled by a scaling characteristic and is greater than a pickup current threshold. In some embodiments, the harmonically-blocked differential element 510 may incorporate an adaptive slope characteristic. For example, the element 510 may receive the external fault input 503, which may be used to select between a single-slope characteristic and a less sensitive, high-security slope characteristic. When the external fault input 503 is asserted, the harmonically-blocked differential element 510 may use the high-security slope characteristic and, when the input 503 is deasserted, the single-slope characteristic may be used. Alternatively, or in addition, the element 510 may include a dual-slope characteristic.

A harmonically-restrained differential element 512 operates in parallel with the harmonically-blocked differential element 510. The harmonically-restrained differential element 512 receives the fundamental operating current $I_{OP}$ input 501 and the restraining current $I_{RT}$ input 502. In addition, the harmonically-restrained differential element 512 receives the harmonic currents input 504, which may include one or more harmonics of the raw operating current $I_{OP\_Raw}$ (not shown). In the FIG. 500 embodiment, the input 504 comprises a second and fourth harmonic of the raw operating current $I_{OP\_Raw}$. The harmonically-restrained differential element 512 may operate according to Equation 8 described above. Therefore, the harmonically-restrained differential 512 may operate (e.g., assert its tripping signal output 513) if the fundamental operating current $I_{OP}$ 501 is greater than a harmonically-restrained, restraining current and is greater than a pickup current threshold. The harmonically-restrained, restraining current may comprise a sum of the scaled restraining current $I_{RT}$ 502, scaled second harmonic of the raw operating current $I_{OP\_Raw}$, and scaled fourth harmonic of the raw operating current $I_{OP\_Raw}$. Like the harmonically-blocked differential element 510, the harmonically-restrained differential element 512 may include a single-slope characteristic, a high-security slope characteristic, and/or a dual-slope characteristic. The characteristic used by the harmonically-restrained differential element 512 may be determined by, inter alia, the external fault input 503.

The harmonically-blocked differential element 510 is supervised by a second- and fourth-harmonic common blocking signal 520. The supervision is provided by passing the output 511 of the differential element 510 through an AND gate 530, which is controlled by the second- and fourth-harmonic common blocking signal 520 (via an inverted input of the AND gate 530, which receives output 528 of the OR gate 527). Accordingly, if the second- and fourth-harmonic common blocking signal 520 is asserted (e.g., harmonic blocking is active), the output 531 of the AND gate 530 is deasserted. The second- and fourth-harmonic common blocking signal 520 may be generated according to Equation 12 and/or using a harmonic blocking element, such as the harmonic blocking element 301 shown in FIG. 3B.

The system 500 may further include supervision by a fifth-harmonic independent blocking signal 537. The fifth-harmonic independent blocking signal 537 may be generated according to Equation 13 and/or using element 400 depicted in FIG. 4. The fifth-harmonic blocking signal 537 supervises both the harmonically-blocked differential element 510 and the harmonically-restrained differential element 512. Therefore, the inverted input of the AND gate 530 includes the fifth-harmonic independent blocking signal 537 (as well as the second- and fourth-harmonic common blocking signal 520 via OR gate 527). The output 513 of the harmonically-restrained differential element 512 flows to the AND gate 534, which is supervised by the fifth-independent blocking signal 537.

In some embodiments, the outputs 531 and 535 of the AND gates 530 and 534 flow to respective switches 540 and 542, which may be used to configure the system 500 to provide different types of differential protection (harmonically-blocked differential protection, harmonically-restrained differential protection, and/or parallel harmonically-blocked and harmonically-restrained differential protection). The outputs 541 and 543 of the switches 540 and 542 flow to an OR gate 550, which generates a tripping signal output 551. Alternatively, the outputs 531 and 535 may flow directly to the OR gate 550 (e.g., the system 500 need not include switches 540 and/or 542).

Figure 6:
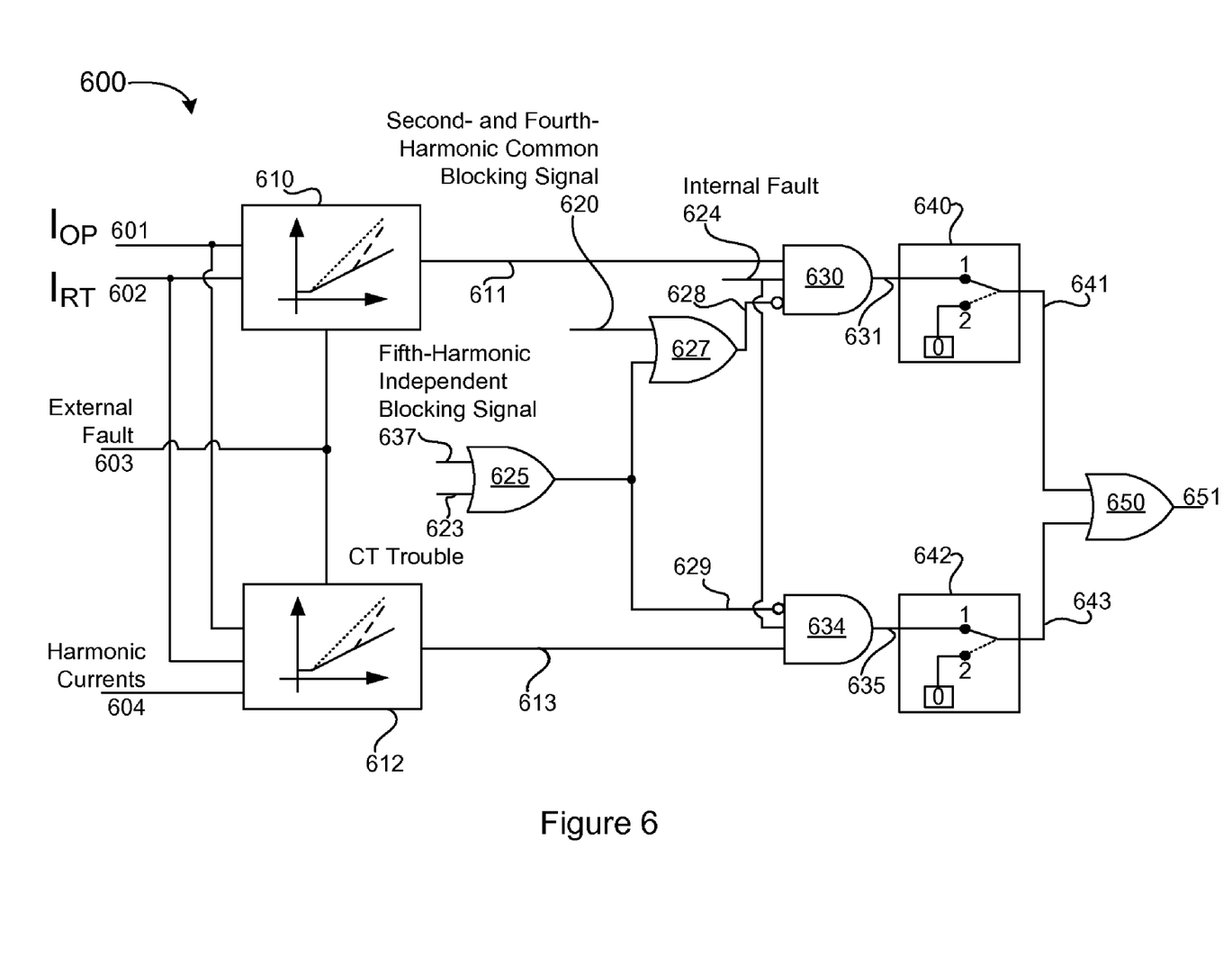
FIG. 6 is a block diagram of another embodiment of a system comprising harmonic blocking and harmonic restraint elements operating in parallel.

FIG. 6 is a block diagram of another embodiment of a system 600 comprising harmonic blocking and harmonic restraint elements operating in parallel. The system 600 may be implemented on and/or in conjunction with an IED, such as the IED 110 shown in FIG. 1. Therefore, the system 600 may be implemented as one or more hardware components and/or one or more computer-readable instructions stored on a computer-readable storage medium (not shown) of the IED. In some embodiments, the computer-readable instructions of system 600 may be embodied as one or more distinct software modules on a computer-readable storage medium.

The system 600 includes a harmonically-blocked differential element 610, which receives a fundamental operating current $I_{OP}$ input 601 and a restraining current $I_{RT}$ input 602. In some embodiments, the harmonically-blocked differential element 610 may receive an external fault input 603, which, as described above, may be used to select one of a plurality of slope characteristics.

The harmonically-blocked differential element 610 may operate according to Equation 5 discussed above. Therefore, the output 611 of the element 610 may assert if the fundamental operating current $I_{OP}$ 601 is greater than the scaled restraining current $I_{RT}$ 602, and is greater than a pickup current threshold.

A harmonically-restrained differential element 612 may operate in parallel with the harmonically-blocked differential element 610. The element 612 receives the operating current $I_{OP}$ input 601, the restraining current $I_{RT}$ input 602, and a harmonic currents input 604. As discussed above, the harmonic currents input 604 may comprise one or more harmonics (e.g., second and fourth harmonics) of a raw operating current $I_{OP\_Raw}$ (not shown). The harmonically-restrained differential element 612 may operate according to Equation 8. Therefore, the output 613 of the harmonically-restrained element 612 may assert if the fundamental operating current $I_{OP}$ 601 is greater than a harmonically-restrained, restraining current and is greater than a pickup current threshold. The harmonically-restrained, restraining current may comprise a sum of the scaled restraining current $I_{RT}$ 602 and one or more harmonics of the raw operating current $I_{OP\_Raw}$ (e.g., scaled second and scaled fourth harmonics of the raw operating current $I_{OP\_Raw}$).

In some embodiments, the harmonically-restrained differential element 612 may comprise a plurality of slope characteristics, including a single-slope characteristic, a high-security slope characteristic, and/or a dual-slope characteristic. The element 612 may select between the slope characteristics according to, inter alia, an external fault input 603 as described above. For example, assertion of the external fault input 603 may cause the harmonically-restrained differential element 612 to increase the characteristics used to scale the restraining current $I_{RT}$ and/or the harmonics of the raw operating current $I_{OP\_Raw}$ to thereby desensitize the element 612. For instance, if the harmonically-restrained differential element 612 operates according to Equation 8, assertion of the external fault input 603 may cause the element 612 to increase the SLP, the $K_2$, and/or the $K_4$ scaling factor(s).

The harmonically-blocked differential element 610 is supervised by a second- and fourth-harmonic common blocking signal 620. Both the harmonically-blocked differential element 610 and the harmonically-restrained differential element 612 may be supervised by a fifth-harmonic independent blocking signal 637. Additional supervision is provided by a current transformer (CT) trouble signal 623 and an internal fault signal 624. The CT trouble signal 623 prevents misoperation due to a CT providing bad current measurements to the system 600. Therefore, the CT trouble signal 623 may be asserted responsive to detecting an error condition in a CT including, but not limited to: an open circuit CT condition, a short circuit CT condition, and/or any other condition that may cause the CT to provide invalid current measurements to the system 600. The internal fault signal 624 adds security during external faults with current transformer saturation.

The AND gate 630 provides for supervision of the output 611 of the harmonically-blocked differential element 610. The AND gate 630 receives the harmonically-blocked tripping signal output 611, the internal fault signal 624, and an inverted input receives a combination 628 of the second- and fourth-harmonic common blocking signal 620, the fifth-harmonic independent blocking signal 637, and the CT trouble signal 623. The AND gate 634 provides for supervision of the output 613 of the harmonically-restrained differential element 612. The AND gate 634 receives the harmonically-restrained tripping signal output 613, the internal fault signal 624, and an inverted input receives a combination 629 of the fifth-harmonic independent blocking signal 637 and the CT trouble signal 623.

In some embodiments, the outputs 631 and 635 of the respective AND gates 630 and 634 flow to switches 640 and 642, which may provide for configuration of the system 600 (e.g., to selectively provide harmonically-blocked, harmonically-restrained, and/or parallel harmonically-blocked and harmonically-restrained differential protection). The OR gate 650 forms a tripping signal 651 output, which combines the parallel outputs 641 and 643 of the switches 640 and 642. Alternatively, the outputs 631 and 635 may flow directly to the OR gate 650.

Although not shown in FIG. 5 or 6, an IED may be communicatively coupled to the tripping signal output 551 of FIG. 5 and/or output 651 of FIG. 6. The IED may be configured to take one or more actions responsive to assertion of the tripping signal output 551 or 651 including, but not limited to: disconnecting the transformer from the rest of the power system, tripping one or more circuit breakers, displaying an alarm on an HMI, transmitting one or more alarm signals, recording measurements (and other data) that caused the tripping signal to assert, and the like.

Figure 7:
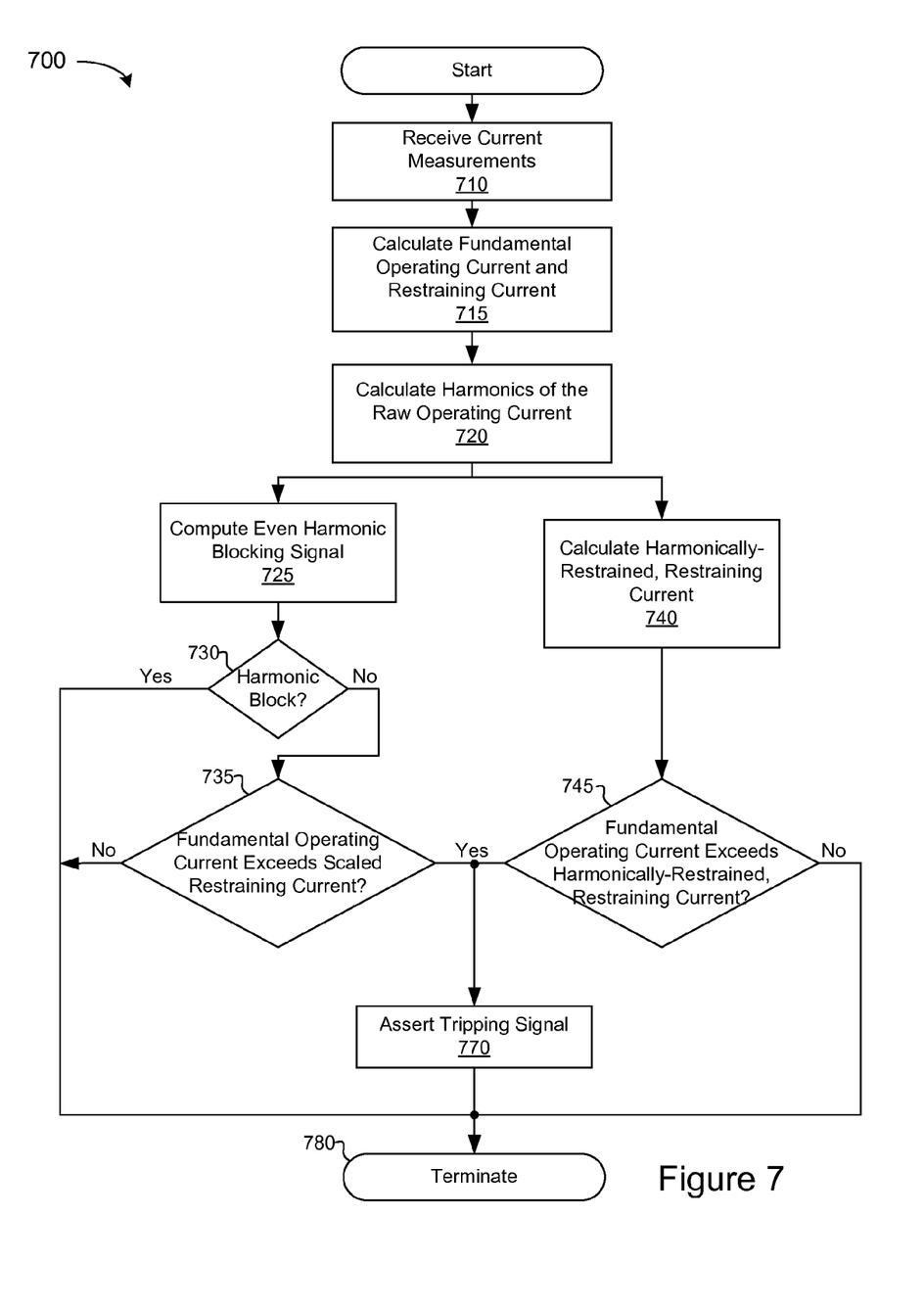
FIG. 7 is a flow diagram of one embodiment of a method for providing parallel harmonically-blocked and harmonically-restrained differential protection.

FIG. 7 is a flow diagram of one embodiment of a method 700 for providing parallel, harmonically-blocked and harmonically-restrained differential protection. The steps of method 700 may be implemented on and/or in conjunction with an IED (not shown), such as the IED 110 of FIG. 1. Therefore, the method 700 may be implemented as one or more hardware components and/or one or more computer-readable instructions stored on a computer-readable storage medium (not shown) of an IED. In some embodiments, the computer-readable instructions of method 700 may be embodied as one or more distinct software modules on the computer-readable storage medium. The method 700 may be performed as part of monitoring process, which may be performed at discrete intervals (e.g., the process 700 may be performed 200 (or more) times per second). Alternatively, or in addition, the method 700 may be configured to operate continuously. Therefore, the steps of the method 700 may represent an iteration of a discretely executed monitoring process and/or a continuously operating monitoring process.

At step 710, one or more current measurements may be received from one or more current transformers in electrical communication with a power system. The current measurements of step 710 may comprise current measurements obtained at portions of a transformer (e.g., at respective windings, ends and/or taps of the transformer). As discussed above, the current measurements may comprise measurements of one or more phases of a three-phase current. Receiving the current measurements at step 710 may further comprise processing the current measurements for use in steps 715 and/or 720 discussed below. The processing may include, but is not limited to: removing alias artifacts from the measurements (e.g., applying an anti-alias filter to the measurements), removing noise from the measurements, performing measurement error checking and correction, performing measurement compensation (e.g., according to the properties, configuration, and/or orientation of the CTs used to obtain the measurements), validating the measurements, obtaining and/or removing harmonic content from the measurements, and the like.

At step 715, a fundamental operating current $I_{OP}$ and a restraining current $I_{RT}$ may be calculated as described above (e.g., according to Equations 1-4).

At step 720, one or more harmonics of the raw operating current $I_{OP\_Raw}$ (e.g., calculated using Equation 1.1 discussed above) may be acquired. As discussed above, the harmonics may comprise one or more even harmonics of the raw operating current $I_{OP\_Raw}$ (e.g., a second harmonic and a fourth harmonic), and/or one or more odd harmonics (e.g., a fifth harmonic of the raw operating current $I_{OP\_Raw}$). However, any number and/or order of harmonics could be calculated at step 720 under the teachings of this disclosure.

At step 725, an even-harmonic blocking signal may be generated. The even-harmonic blocking signal may comprise a second- and fourth-harmonic common blocking signal generated per Equation 12 and/or harmonic blocking element 301 of FIG. 3B, which may incorporate even-harmonic blocking signals of multiple elements (e.g., each element measuring one or more phases of a three-phase signal). Alternatively, the even-harmonic blocking signal may be an even-harmonic individual blocking signal calculated per Equations 9-11 and/or the harmonic blocking element 300 of FIG. 3A.

At step 730, the even-harmonic blocking signal calculated at step 725 may be evaluated. If the even-harmonic blocking signal is asserted, the harmonic blocking portion of the flow may terminate at 780, which may cause the method 700 to bypass the harmonically-blocked differential protection of step 735; otherwise, the flow may continue at step 735.

At step 735, the fundamental operating current $I_{OP}$ may be compared to the restraining current $I_{RT}$ scaled by a scaling characteristic and a pickup current threshold. The comparison may follow Equation 5 described above, and may include scaling the restraining current $I_{RT}$ by a slope characteristic. In some embodiments, the comparison of step 735 may comprise selecting and/or adapting one of a plurality of slope characteristics. The slope characteristic may be selected and/or adapted according to conditions detected within the power system (e.g., an external fault or other condition). If the fundamental operating current $I_{OP}$ is greater than the scaled restraining current $I_{RT}$ and is greater than a pickup current threshold, the flow may continue at step 770; otherwise, the flow may terminate at 780.

In parallel with step 725, at step 740, a harmonically-restrained, restraining current may be calculated. The harmonically-restrained, restraining current may be calculated according to Equations 6 and/or 7, and may comprise a sum of a scaled restraining current $I_{RT}$ and one or more scaled harmonics of the raw operating current $I_{OP\_Raw}$. In the FIG. 7 embodiment, the harmonically-restrained, restraining current may comprise a sum of the scaled restraining current $I_{RT}$, a scaled second harmonic of the raw operating current $I_{OP\_Raw}$, and a scaled fourth harmonic of the raw operating current $I_{OP\_Raw}$. In some embodiments, calculating the harmonically-restrained, restraining current at step 740 may comprise selecting one or more slope characteristics and/or scaling constants (e.g., SLP, $K_2$ and/or $K_4$ of Equation 8). As discussed above, the selection may be based upon inter alia an external fault signal, conditions within the power system (e.g., the amount of current flowing through the transformer), and the like.

At step 745, the fundamental operating current $I_{OP}$ may be compared to the harmonically-restrained, restraining current and the pickup current threshold per Equation 8. If the operating current is greater than the harmonically-restrained, restraining current (and greater than the pickup current threshold) the flow may continue at step 770; otherwise, the flow may terminate at 780.

At step 770, a tripping signal may be asserted. As shown in FIG. 7, the tripping signal of step 770 may be asserted via the parallel harmonic-blocking protection of steps 725-735 and/or the harmonically-restrained protection of steps 740-745. Although not shown in FIG. 7, assertion of the tripping signal at 770 may cause the method 700 (or other method or process implemented by e.g., an IED) to take one or more actions including, but not limited to: isolating the transformer from the rest of the power system, tripping one or more breakers, displaying one or more alarms (e.g., in an HMI), transmitting one or more alarm signals, recording measurements (and other data) that caused the tripping signal to assert, and the like.

Figure 8:
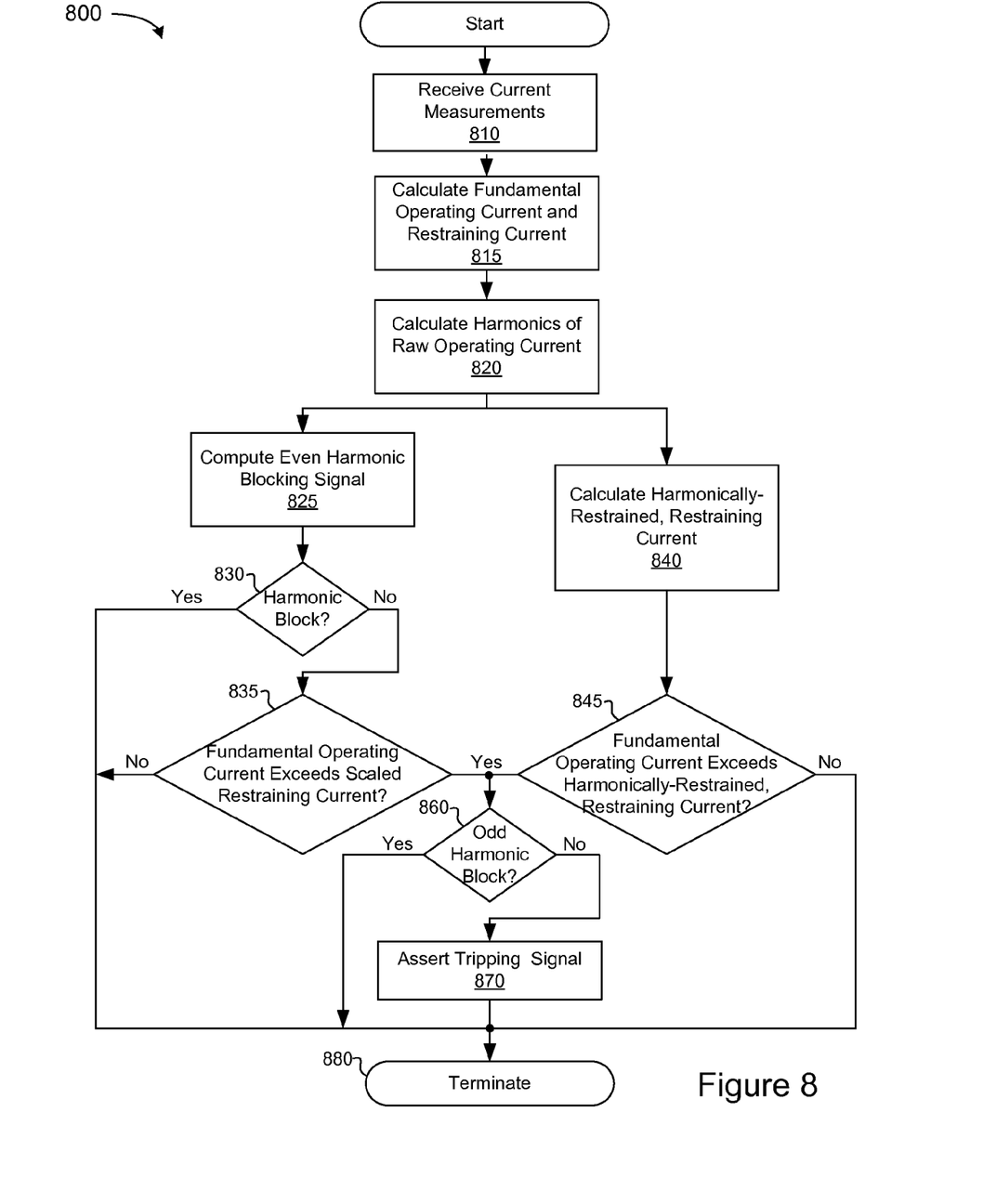
FIG. 8 is a flow diagram of another embodiment of a method for providing parallel harmonically-blocked and harmonically-restrained differential protection.

FIG. 8 shows another embodiment of a method 800 for providing parallel harmonically-blocked and harmonically-restrained differential protection. The steps of method 800 may be implemented on and/or in conjunction with an IED (not shown), such as the IED 110 of FIG. 1. Therefore, the method 800 may be implemented as one or more hardware components and/or one or more computer-readable instructions stored on a computer-readable storage medium (not shown) of an IED. In some embodiments, the computer-readable instructions of method 800 may be embodied as one or more distinct software modules on the computer-readable storage medium. The method 800 may be performed as part of monitoring process, which may be performed at discrete intervals (e.g., the process 800 may be performed 200 (or more) times per second). Alternatively, or in addition, the method 800 may be configured to operate continuously. Therefore, the steps of the method 800 may represent an iteration of a discretely executed monitoring process and/or a continuously operating monitoring process.

The embodiment of FIG. 8 includes an odd harmonic blocking step 860, which may supervise the operation of both the harmonic-blocking differential protection of steps 825-835 and the harmonic-restraint differential protection of steps 840-845. Steps 810-845 and 870-880 may be performed as described above in conjunction with steps 710-745 and 770-780 of FIG. 7.

The odd-harmonic blocking of step 860 may comprise the evaluation of a fifth-harmonic blocking condition per Equation 13, which may provide protection from misoperation of the method 800 due to current transformer overexcitation or the like. Therefore, at step 860, if a scaled, fifth harmonic of the raw operating current $I_{OP\_Raw}$ is greater than the fundamental operating current $I_{op}$, the flow may terminate at step 880, bypassing assertion of the tripping signal at step 870; otherwise, the flow may continue to step 870 where a tripping signal may be asserted. Step 860 may further comprise evaluation of an internal fault signal and/or a CT trouble signal as described above in conjunction with FIG. 6. For example, at step 860, the flow may bypass step 870 if an internal fault signal is not asserted and/or a CT trouble signal is asserted.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable medium having stored instructions thereon that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

What is claimed is:

1. An intelligent electronic device (IED) communicatively coupled to an electrical power system to receive current measurements from a transformer and to calculate a fundamental operating current, a restraining current, and one or more harmonics of a raw operating current therefrom, the IED comprising:
    a harmonically-blocked differential element configured to assert a harmonically-blocked tripping signal based on the fundamental operating current, the restraining current, and the one or more harmonics of the raw operating current; and
    a harmonically-restrained differential element configured to generate a harmonically-restrained tripping signal based on the fundamental operating current, the restraining current, and the one or more harmonics of the raw operating current;
    wherein the IED is configured to combine the harmonically-blocked tripping signal and the harmonically-restrained tripping signal into a tripping signal output.

2. The IED of claim 1, wherein the IED is configured to selectively combine the harmonically-blocked tripping signal and the harmonically-restrained tripping signal into the tripping signal output.

3. The IED of claim 1, wherein the harmonically-blocked differential element is configured to assert the harmonically-blocked tripping signal if the fundamental operating current is greater than the restraining current scaled by a scaling factor.

4. The IED of claim 1, wherein the harmonically-blocked differential element is configured to block the harmonically-blocked tripping signal if one or more scaled harmonics of the raw operating current are greater than the fundamental operating current.

5. The IED of claim 1, wherein the harmonically-blocked differential element is configured to block the harmonically-blocked tripping signal if one or more scaled, even harmonics of the raw operating current are greater than the fundamental operating current.

6. The IED of claim 1, wherein the harmonically-blocked differential element is configured to block the harmonically-blocked tripping signal if a scaled second harmonic of the raw operating current is greater than the fundamental operating current or a scaled fourth harmonic of the raw operating current is greater than the fundamental operating current.

7. The IED element of claim 1, wherein the current measurements comprise measurements of one or more phases of a three-phase current, and wherein the harmonically-blocked differential element is configured to block the harmonically-blocked tripping signal if a scaled second harmonic or a scaled fourth harmonic of a raw operating current derived from one or more of the phases is greater than a respective fundamental operating current derived from the one or more phases.

8. The IED of claim 1, further comprising a harmonic blocking element configured to supervise the harmonically-blocked tripping signal and the harmonically-restrained tripping signal using the fundamental operating current and one or more odd harmonics of the raw operating current.

9. The IED of claim 8, wherein the harmonic blocking element is configured to block the harmonically-blocked tripping signal and the harmonically-restrained tripping signal if a scaled fifth harmonic of the raw operating current is greater than the fundamental operating current.

10. The IED of claim 1, wherein the harmonically-restrained differential element is configured to compute a harmonically-restrained, restraining current using the restraining current and the one or more harmonics of the raw operating current, and is further configured to assert the harmonically-restrained tripping signal if the operating current is greater than the harmonically-restrained, restraining current.

11. The IED of claim 10, wherein the harmonically-restrained, restraining current comprises a sum of scaled even harmonics of the raw operating current.

12. The IED of claim 10, wherein the harmonically-restrained, restraining current comprises a sum of a scaled second harmonic of the raw operating current and a scaled fourth harmonic of the raw operating current.

13. The IED of claim 1, wherein the IED is configured to isolate the transformer from the electrical power system responsive to the tripping signal output.

14. A method for providing harmonic blocking and harmonic restraint operating in parallel, comprising:
receiving current measurements from one or more current transformers electrically coupled to one or more portions of a power system;
calculating a fundamental operating current, a restraining current, and one or more harmonics of a raw operating current using the current measurements;
generating a harmonically-blocked tripping signal based on the fundamental operating current and the restraining current, wherein the harmonically-blocked tripping signal is supervised using the fundamental operating current and the one or more harmonics of the raw operating current;
generating a harmonically-restrained tripping signal based on the fundamental operating current and a harmonically-restrained, restraining current comprising a sum of the restraining current and one or more harmonics of the raw operating current; and
combining the harmonically-blocked tripping signal and the harmonically-restrained tripping signal into a tripping signal output.

15. The method of claim 14, wherein generating the harmonically-blocked tripping signal comprises asserting the harmonically-blocked tripping signal if the fundamental operating current is greater than the restraining current scaled by a scaling factor.

16. The method of claim 14, wherein the harmonically-blocked tripping signal is supervised by blocking the harmonically-blocked tripping signal if one or more scaled harmonics of the raw operating current are greater than the fundamental operating current.

17. The method of claim 14, wherein the current measurements comprise measurements of a three-phase current, and wherein the harmonically-blocked tripping signal is supervised by blocking the harmonically-blocked tripping signal if one or more scaled harmonics of one or more phases of the raw operating current is greater than a respective fundamental operating current.

18. The method of claim 14, wherein the harmonically-blocked tripping signal is supervised by blocking the harmonically-blocked tripping signal if a scaled second harmonic or a scaled fourth harmonic of the raw operating current is greater than the fundamental operating current.

19. The method of claim 14, wherein generating the harmonically-restrained tripping signal comprises:
calculating a harmonically-restrained, restraining current comprising a sum of the restraining current scaled by a scaling factor and one or more scaled harmonics of the raw operating current; and
asserting the harmonically-restrained tripping signal if the fundamental operating current is greater than the harmonically-restrained, restraining current.

20. The method of claim 19, wherein the harmonically-restrained, restraining current comprises a sum of scaled even harmonics of the operating current.

21. The method of claim 19, wherein the harmonically-restrained, restraining current comprises a sum of a scaled second harmonic of the raw operating current and a scaled fourth harmonic of the raw operating current.

22. The method of claim 14, further comprising supervising the harmonically-blocked tripping signal and the harmonically-restrained tripping signal using the fundamental operating current and one or more odd harmonics of the raw operating current.

23. The method of claim 22, wherein supervising the harmonically-blocked tripping signal and the harmonically-restrained tripping signal comprises blocking the harmonically-blocked tripping signal and the harmonically-restrained tripping signal if a scaled fifth harmonic of the raw operating current is greater than the fundamental operating current.

24. The method of claim 14, further comprising isolating a transformer from an electrical power system responsive to the tripping signal output.

25. A system for providing harmonic blocking and harmonic restraint operating in parallel, comprising:
an intelligent electronic device (IED) in communication with one or more current transformers electrically coupled to respective portions of an electrical power system to obtain current measurements therefrom, wherein the IED is configured to calculate a fundamental operating current, one or more harmonics of a raw operating current, and a restraining current using the current measurements;
a harmonically-blocked differential element configured to generate a harmonically-blocked tripping signal if the fundamental operating current is greater than the restraining current scaled by a scaling factor, and to block the harmonically-blocked tripping signal if a scaled second harmonic or a scaled fourth harmonic of the raw operating current is greater than the fundamental operating current; and
a harmonically-restrained differential element configured to compute a harmonically-restrained restraining current comprising a sum of the restraining current scaled by a scaling factor, a scaled second harmonic of the raw operating current, and a scaled fourth harmonic of the raw operating current, and to assert a harmonically-restrained tripping signal if the fundamental operating current is greater than the harmonically-restrained, restraining current;
wherein the harmonically-blocked differential element and the harmonically-restrained differential element operate in parallel, and wherein the IED is configured to selectively combine and the harmonically-blocked tripping signal and the harmonically-restrained tripping signal into a tripping signal output.

26. The system of claim 25, further comprising a fifth-harmonic blocking element configured to block the tripping signal output if a scaled fifth harmonic of the raw operating current is greater than the fundamental operating current.

* * * * *

UNITED STATES PATENT AND TRADEMARK OFFICE
CERTIFICATE OF CORRECTION

| | | |
|---|---|---|
| PATENT NO. | : 8,194,374 B2 | Page 1 of 1 |
| APPLICATION NO. | : 12/424705 | |
| DATED | : June 5, 2012 | |
| INVENTOR(S) | : Armando Guzman-Casillas and Norman Fischer | |

It is certified that error appears in the above-identified patent and that said Letters Patent is hereby corrected as shown below:

The Assignee shown on the front page (Item 73: Assignee) is erroneously written "Schweitzser Engineering Laboratories, Inc."

Please correct with the proper assignee name that is listed on the assignment (recorded at reel/frame 022554/0086) as well as on the Issue Fee Transmittal and the Statement under 37 CFR 3.73(b), the assignee being:
Schweitzer Engineering Laboratories, Inc., Pullman, WA (US)

Signed and Sealed this
Twenty-fourth Day of July, 2012

David J. Kappos
*Director of the United States Patent and Trademark Office*